United States Patent [19]

Waitkus et al.

[11] 4,277,583

[45] Jul. 7, 1981

[54] OXIRANE POLYIMIDE COPOLYMERS

[75] Inventors: Phillip A. Waitkus; Bohumir Lepeska, both of Sheboygan, Wis.

[73] Assignee: Plastics Engineering Company, Sheboygan, Wis.

[21] Appl. No.: 99,426

[22] Filed: Dec. 3, 1979

[51] Int. Cl.$^3$ .................. C08L 63/00; C08L 77/06
[52] U.S. Cl. .................. 525/423; 525/180; 525/436
[58] Field of Search ............ 260/830 P; 525/423

[56] References Cited

U.S. PATENT DOCUMENTS

| | | | |
|---|---|---|---|
| 3,179,634 | 4/1965 | Edwards | 260/78 |
| 3,416,994 | 12/1968 | Chalmers | 260/830 P |
| 3,453,292 | 7/1969 | Izumi | 260/830 P |
| 3,663,651 | 5/1972 | Traut | 260/830 P |
| 3,838,101 | 9/1974 | Steele | 260/830 P |
| 3,839,493 | 10/1974 | Balme | 260/830 P |

FOREIGN PATENT DOCUMENTS 46-41821  10/1971  Japan .................. 260/830 P

*Primary Examiner*—Paul Lieberman
*Attorney, Agent, or Firm*—Walter J. Monacelli

[57] ABSTRACT

The copolymers disclosed herein comprise the reaction products of polyoxirane or polyepoxide compounds with amine-terminated aromatic polyimides. The reaction of the oxirane group with the amine group produces hydroxylamine groups which connect the polyimide portion with the polyepoxide precursor portion of the resultant copolymer without by-product formation. These copolymers are more tractable than the original unreacted amine-terminated polyimides and can be converted at appropriate lower temperatures to insoluble, infusible polymers. Thus they can be fabricated economically at lower temperatures and pressures and extend greatly the number of applications for which the aromatic polyimides can be employed.

29 Claims, No Drawings

OXIRANE POLYIMIDE COPOLYMERS

BACKGROUND OF THE INVENTION

1. Field of the Invention

This invention relates to a new composition of matter comprising copolymers of oxiranes, preferably polyoxirane compounds and aromatic polyimides. More specifically, it relates to such compositions in which the polyimides are amine-terminated polymers. Still more specifically, it relates to such oxirane-polyimide copolymers having improved tractability as compared to polyimide polymers per se.

2. State of the Prior Art

Polyimide resins as prepared from aromatic dianhydrides and aromatic diamines are known to have the desired property of high heat resistance and high solvent resistance. However because of these very same properties, they are untractable and therefore very difficult and expensive to work into desired shapes and forms.

On the other hand, while polymers derived from oxirane compounds, such as epoxy phenolics, i.e., resins from diglycidyl bis-phenol-A, etc., may be cured at reasonably low temperatures, the thermal stability of such polymers is much less than desired. To facilitate economical use of the polyimide resins, it would be desirable to prepare low molecular weight polymers, or oligomers, which may be copolymerized at relatively low temperatures to insoluble, infusible higher molecular weight polymers with little or no by-product formation and with thermal stabilities improved over epoxy phenolics. Moreover, it would also be desirable to convert the less expensive polymers derived from oxirane compounds to compositions having improved heat stability.

Several recent patents, such as U.S. Pat. Nos. 3,897,395 and 4,026,904 show the extension of aromatic polyimides by the coupling of terminal groups. In U.S. Pat. No. 3,897,395, the coupling groups are primarily unsaturated groups such as vinyl, propargyl, etc., and in U.S. Pat. No. 4,026,904, vinyl terminated polyimides are peroxidized to give epoxy-terminal groups. However, in neither of these patents has there been found any reference or disclosure to the copolymerization of oxirane compounds, particularly polyoxirane compounds with amine-terminated aromatic polyimides.

In the prosecution of the parent application, Chalmers et al, U.S. Pat. No. 3,416,994 was cited. However, as shown hereinafter in Example XVI, the polymer used by patentees with epoxy compositions is one having predominantly —COOH and —CONH— groups along the polymer chain. Therefore because of the preponderance of these, the epoxy groups will react with these instead of the terminal amine groups. Moreover because of the conditions used in producing the ultimate polyimide structure, this will be crosslinked and insoluble and its terminal amine groups inaccessible for epoxy reaction.

SUMMARY OF THE INVENTION

In accordance with the present invention it has been found that tractable and curable aromatic polyimides may be prepared by the copolymerization of oxirane compounds, preferably polyoxirane compounds, with linear m-cresol soluble amine-terminated aromatic polyimides. Moreover, it has also been found that polymeric compositions of oxirane compounds may be improved in heat resistance and various other properties by the copolymerization of the oxirane compounds with the linear m-cresol soluble amine-terminated aromatic polyimides. Where the ultimate use of the product permits, the copolymer may comprise a major part of the oxirane component with the product having improved heat resistance, solvent resistance, etc. while retaining the economic advantage of the less expensive oxirane components. On the other hand, where the ultimate use is more concerned with high heat and solvent resistance and other properties of the polyimides, the copolymer advantageously comprises a predominant portion of the aromatic polyimide. In such case, however, the amount of oxirane compound is sufficient to provide at least one oxirane group per amine group in the polyimide. The exact minimum of oxirane compound will depend somewhat on the molecular weight of the polyimide, with lower molecular weight polyimides, which have a greater number of terminal amine groups per unit weight of polyimide, requiring a greater number of oxirane groups than higher molecular weight polyimides which have a lesser number of terminal amine groups per unit weight.

The amine-terminated polyimides used in preparing the copolymers of this invention have the formula:

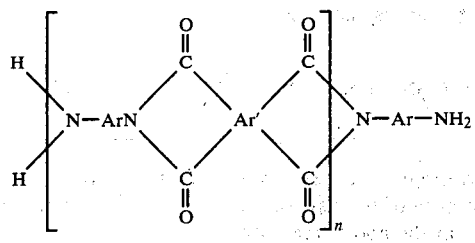

wherein

Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical one or both pairs of the carbonyl groups may be attached to peri carbon atoms;

Ar is a divalent aromatic radical, and n is an integer of at least one, preferably 1–20.

The amine-terminated polyimides used in the process of the present invention are prepared by using a molar excess of an aromatic diamine with an aromatic dianhydride to form oligomeric or higher molecular weight polyimides. The aromatic dianhydride has the formula:

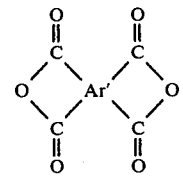

wherein Ar' is a tetravalent aromatic organic radical, preferably containing at least one ring of six carbon atoms, said ring characterized by benzenoid unsaturation, the four carbonyl groups being attached directly to separate carbon atoms and each pair of carbonyl groups being attached to adjacent carbon atoms in the Ar' radical except that when Ar' represents the naphthalene radical, one or both pairs of carbonyl groups may be attached to the peri carbon atoms.

The aromatic diamines useful in this preparation are represented by the formula $H_2N-AR-NH_2$ wherein Ar is a divalent aromatic organic radical.

The oxirane compounds used in preparing the copolymers of this invention have two or more oxirane moieties therein represented by the structure:

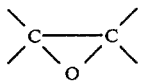

characterized by having an oxygen atom attached to two adjacent carbon atoms. The simplest compound of this structure is obviously a substituted ethylene oxide which has the formula:

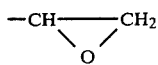

When an oxirane compound is reacted with an amine group of an amine-terminated polyimide, the reaction may be represented as:

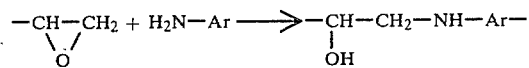

Accordingly, the resultant copolymeric structures have a plurality of the hydroxyalkylamino structures as indicated in the above reaction.

The amine group (—NH—) is capable of further reaction with more oxirane groups to produce the structure

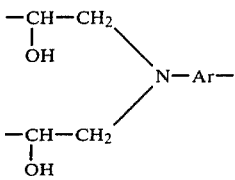

The resultant tertiary amine may catalyze the polymerization of additional oxirane groups to form the structure:

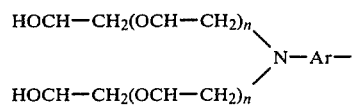

In general terms, di-oxirane compounds are represented as Z

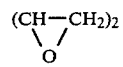

in which Z represents a divalent organic moiety. The copolymerization of one mole of an amine-terminated polyimide, which contains two terminal-$NH_2$ groups with one mole of a diepoxy compound of the formula

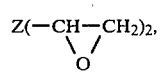

will introduce hydroxyalkyl links connecting the polyimide portions of the copolymers, thus forming:

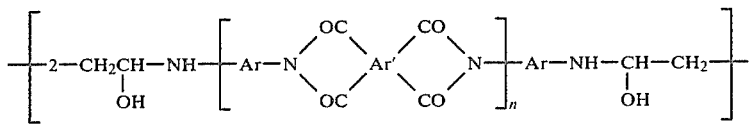

Further reactions with additional amounts of

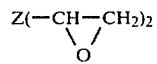

obviously will produce crosslinkages at the —NH— atom groups in the polymer chains, thus producing:

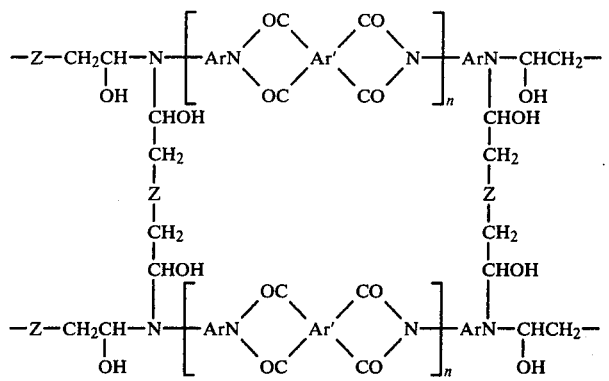

Since the reactions are addition reactions, no by-products are formed. This is important in that these copolymerization reactions thereby produce void-free moldings, laminated products, reinforced laminates, wire coatings, etc.

Advantageously there is used an amount of oxirane compound to supply at least one oxirane group per amine group in the polyimide. Preferably there is an excess of the oxirane groups to insure complete reaction, although the use of less than one oxirane group per each amine group will yield partial reaction products which will contribute some tractability to the total mixture. Therefore, lesser amounts may also be used such as 0.50 or even as little as 0.1 mole may be used to advantage.

In preparing the amine-terminated polyimides, any of the aromatic tetracarboxylic acid dianhydrides known in the prior art can be used. Among the useful dianhydrides are 3,3',4,4'-benzopheneonetetracarboxylic acid dianhydride, pyromellitic dianhydride, 2,3,6,7-naphthalene tetracarboxylic acid dianhydride, 1,4,5,6-tetracarboxylic dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl) propane dianhydride, 3,4,9,10-perylene tetracarboxylic acid dianhydride, bis(3,4-dicarboxyphenyl) ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis)2,3-dicarboxyphenyl) propane dianhydride, 1,1-bis (2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, bis(3,4-dicarboxyphenyl) sulfone dianhydride, and benzene-1,2,3,4-tetracarboxylic acid dianhydride. The first three mentioned dianhydrides are preferred.

Aromatic diamines useful in preparing the starting polyimides have the formula:

wherein Ar is a divalent aromatic organic radical. Preferred aromatic diamines are those wherein Ar is a divalent benzenoid radical selected from the group consisting of:

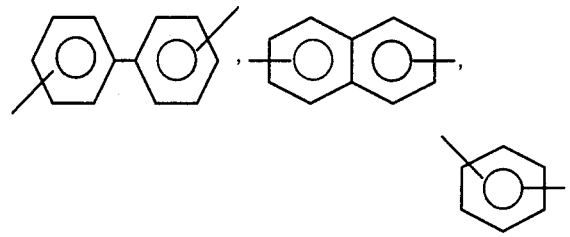

and multiples thereof connected to each other by $R^{III}$, e.g.,

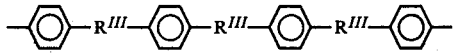

wherein $R^{III}$ is $-CH=CH-$,

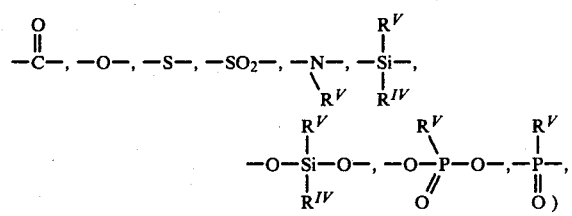

or an alkylene chain of 1-3 carbon atoms, wherein $R^V$ and $R^{IV}$ are each selected from the group consisting of alkyl and aryl containing one to six carbon atoms, e.g., methyl, ethyl, hexyl, n-butyl, i-butyl and phenyl.

Examples of the aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 3,3'-diamino-diphenyl sulfone, 4,4'-diamino-diphenyl sulfone, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine and mixtures thereof, 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'dimethyl-4,4'-diaminodiphenylether, 3,3'-diethyl-4,4'-diaminodiphenylether,, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diaminodiphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone,3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,4-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol and 2,4-diaminobenzenesulfonic acid and phenylene diamines. Preferred diamines are 4,4'-oxydianiline, 4,4'-sulfonyldianiline, 4,4'-methylene dianiline, 4,4'-diaminobenzophenone, 4,4'-diaminostilbene and the phenylene diamines.

The polyimide starting materials used in the process of this invention may be prepared conveniently in linear m-cresol solution soluble form by the method shown in U.S. Pat. Nos. 3,897,395 and 4,058,505 by reacting the dianhydride with the diamine in a phenol-solvent of the formula:

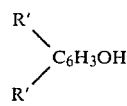

where each R' is hydrogen or a methyl radical in the presence of certain organic azeotroping agents, particularly cyclic hydrocarbons of 6 to 8 carbon atoms and most preferably benzene or toluene until most of the water of reaction is eliminated. The reaction temperature is less than 140° C. and also should be below the boiling point of the phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially the trap is filled with azeotroping agent. For brevity, this apparatus will be referred to herein as cresolbenzene azeotropic apparatus.

By using an excess of the amine, the terminal groups of the polyimide will be amine groups. The more excess there is of the amine, the shorter will be the molecular length. Advantageously the amount of excess amine is calculated in accordance with the desired length or molecular weight of the desired starting polyimide.

Alternatively the amine-terminated polyimide may be prepared by reacting linear-m-cresol soluble anhydride-terminated polyimides with two moles of diamine (NH₂ArNH₂) per mole of anhydride-terminated polyimide.

For the production of the copolymers of this invention, polyepoxide compounds having at least two epoxy or oxirane groups are used. The polyepoxide may possess as high as ten or twenty or even a hundred or more oxirane moieties or structures as in the case of the polyglycidyl acrylates and methacrylates.

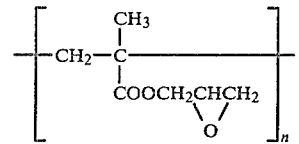

prepared by the procedure given in the Journal of Macromolecular Science-Chemistry, A3(5), 1207 (1969). The polyepoxide reactants suitable for use in the preparation of the copolymers of this invention are essentially unlimited.

The particular polyepoxide selected for use will depend on such factors as the properties desired in the polymer, cost, reactivity, commercial availability and on practical as well as theoretical condiserations. The polyepoxides can be saturated, unsaturated, aliphatic, cycloaliphatic, aromatic and heterocyclic, and can be written as Z

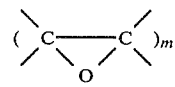

wherein m is a numerical value of at least two and Z is a polyvalent organic radical whose valency corresponds to m and is selected from aliphatic and aromatic structures such as alkylene, substituted alkylenes, alkyleneoxy, alkenylene, substituted alkenylene, arylene, substituted arylene, aliphatic and aromatic amides, imides, esters, ethers, and the like.

Useful polyepoxides include glycidyl ethers derived from epichlorohydrin adducts of polyols and particularly polyhydric phenols, especially HOArOH wherein Ar is as previously defined. A particularly suitable epoxide is the diglycidyl ether of bisphenol A of the formula:

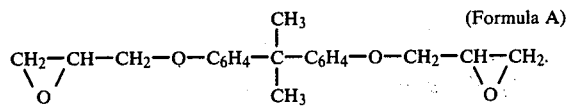

(Formula A)

Additional examples of other polyepoxides are: resorcinol diglycidyl ether; 3,4-epoxy-6-methylcyclohexylmethyl-9,10-epoxystearate, 1,2,-bis(2,3-epoxy-2-methylpropoxy) ethane, the diglycidyl ether of 2,2-(p-hydroxyphenyl) propane, butadiene dioxide, dicyclopentadiene dioxide, pentaerythritol tetrakis(3,4-epoxycyclohexanecarboxylate), vinylcyclohexene dioxide, divinylbenzene dioxide, 1,5-pentadiol bis(3,4-epoxycyclohexanecarboxylate), ethylene glycol bis(3,4-epoxycyclohexanecarboxylate), 2,2-diethyl-1,3-propanediol bis(3,4-epoxycyclohexanecarboxylate), 1,6-hexanediol bis(3,4-epoxycyclohexanecarboxylate), 2-butene-1,4-diol bis(3,4-epoxy-6-methylcyclohexanecarboxylate), 1,1,1-trimethylolpropane tris (3,4-epoxycyclohexanecarboxylate), 1,2,3-propanetriol tris(3,4-epoxycyclohecanecarboxylate), dipropylene glycol bis(2-ethylexyl-4,5-epoxycyclohexane-1,2-dicarboxylate), diethylene glycol bis(3,4-epoxy-6-methylcyclohexanecarboxylate), triethylene glycol bis(3,4-epoxycyclohexanecarboxylate), 3,4-epoxycyclohexylmethyl 3,4-epoxycyclohexanecarboxylate, 3,4-epoxy-1-methylcyclohexylmethyl 3,4-epoxy-1-methylcyclohexanecarboxylate, bis(3,4-epoxycyclohexylmethyl) pimelate, bis(3,4-epoxy-6-methylenecyclohexylmethyl) maleate, bis(3,4-epoxy-6-methylcyclohexylmethyl) succinate, bis(3,4-epoxycyclohexylmethyl) oxalate, bis(3,4-epoxy-6-methylcyclohexylmethyl) sebacate, bis(3,4-epoxy-6-methylcyclohexylmethyl) adipate, bis(3,4-epoxycyclohexylmethyl) terephthalate, bis(3,4-epoxy-6-methylcyclohexylmethyl) terephthalate, 2,2'-sulfonyldiethanol bis(3,4-epoxycyclohexanecarboxylate), N,N'-ethylene bis(4,5-epoxycyclohexane-1,2-dicarboximide), di(3,4-epoxycyclohexylmethyl) 1,3-tolylenedicarbamate, 3,4-epoxy-6-methylcyclohexanecarboxaldehyde acetal, 3,9-bis(3,4-epoxycyclohexyl)spirobi-(metadioxane),

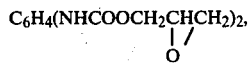

etc.

Another class of suitable polyepoxide reactants comprises the polyglycidyl ether-terminated organic polyhydric alcohols having molecular weights from about 100 to 4,000, and particularly from about 150 to 1,000. The polyhydric alcohols, for example having two or three hydroxy groups, are preferably: poly(oxyalkylene) glycols; alkylene oxide adducts of aliphatic polyols, and polyhydroxy phenolic compounds. The alkylene groups of the poly(oxyalkylene) glycols and alkylene oxides can have from two to four carbon atoms, and particularly from two to three carbon atoms. The poly(-glycidyl ether) terminated polyhydric alcohols (polyols) can be represented by the formula:

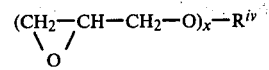

wherein x is an integer such as two or three and $R^{iv}$ represents the polyol residue after removal of terminal hydroxy groups. The diglycidyl ether of bis-phenol A is a satisfactory example of such polyepoxides, as shown in the formula given hereinabove. Illustrative of other polyglycidyl ethers of polyols of the above formula, there can be mentioned those prepared by the reaction of about two moles of epichlorohydrin with one mole of a polyethylene glycol or polypropylene glycol having a molecular weight of 200, 400 or 800, or with one mole of tetramethyleneglycol, tetrapropylene glycol and the like, respectively, or about three moles of epichlorohydrin with trimethylol propane or its adducts with ethylene- or propylene-oxide, etc.

Particularly advantageous oxirane compounds to use for the present invention are the epoxy-terminated polyimides disclosed in U.S. Pat. No. 4,026,904 having as terminal groups

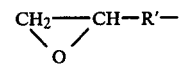

radicals wherein R' is a divalent aromatic radical, such as phenylene and other divalent benzenoid radicals listed above as suitable for the Ar radical of diamines used in preparing the polyimides. By using such epoxy-terminated polyimides with the amine-terminated polyimides, the resulting copolymers comprise predominantly or substantially all polyimide structure.

Also suitable for this purpose are Novolac resins to which an appropriate number of glycidyl groups or other oxirane radicals have been attached and represented by the formula:

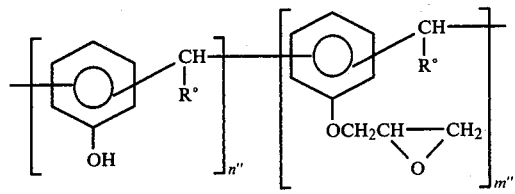

wherein n'' and m'' are integers representing appropriate numbers of hydroxy and oxirane, and R° represents hydrogen or a hydrocarbon radical of 1 to 10, preferably 1 to 6 carbon atoms, e.g. methyl, ethyl, propyl, allyl, butyl, amyl, hexyl, phenyl, cyclohexyl, tolyl, methylcyclohexyl, etc. Where there are only a few benzenoid repeating units, n'' may be zero and all of the hydroxy groups in the Novolac resin may be replaced by oxirane radicals. As the number of benzenoid radicals increases, the relative proportion of oxirane radicals to hydroxyl groups may be decreased in accordance with the desired number of attachments to be made to polyimide molecules. In the Novolac resins substituted benzenoid radicals may also be used as well as polynuclear benzenoid radicals. In the above formulas the sum of the n'' and m'' integers may go as high as 50 or more and when all of the hydroxy groups are substituted by glycidyl groups, n" will have a value of 0.

Thus such oligomeric oxirane-containing compositions may be represented by the formula:

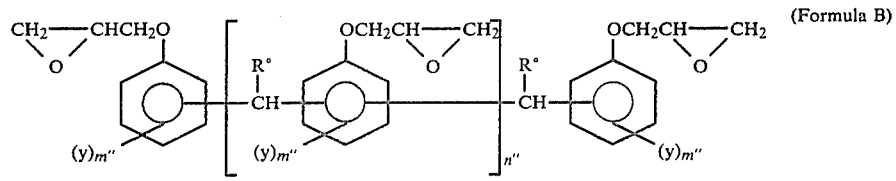
(Formula B)

wherein y represents halogen (e.g. Cl, Br, I or F) or a hydrocarbon radical of 1-18, preferably 1-6 carbon atoms, n" is an integer having a value of 1-50, preferably 1-20 and m" is an integer having a value of 0 to 3. When m" is one, the oligomeric Novolac glycidyl ether will contain three epoxy groups permolecule. The hydrocarbon groups may be alkyl, alkenyl, akynyl, cycloalkyl, and aryl, including alkylaryl, alkenylaryl, cycloalkylaryl, etc. The typical members of these groups are well known and illustrated in the literature. Preferably these are methyl, ethyl, propyl, butyl, amyl, hexyl, etc.

Moreover, in addition to the diglycidyl ether of bisphenol-A described above, various oligomers of this monomer may be used, such as those having the following formula:

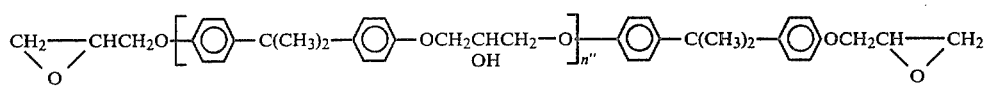

Thus, when n" is zero the formula reduces to Formula A given hereinabove. Furthermore, the

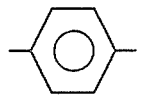

shown in the above formula may be replaced by the

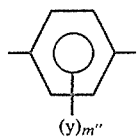

shown above in the preceding formula and the —C(CH₃)₂— group may be replaced by methylene, ethylene, ethylidene, propylene, butylene, butylidene groups or oxygen, sulfur, fulfone, or the like.

Additional examples of polyepoxide compounds are given in U.S. Pat. Nos. 3,334,110; 3,341,337, 3,415,901 and 3,440,230 which are hereby incorporated herein by reference thereto.

The proortions of the oxirane compositions in excess of the stoichiometric amount of oxirane radicals to react with all of the anhydride groups depend on the properties desired in the ultimate copolymer.

The preferred epoxides for the practice of this invention, because of their ease of synthesis, availability of intermediates and cost, are the polyepoxides obtained as glycidyl ethers by the reaction of polyhydric phenols, Ar(OH)₂, with epichlorohydrin, the various oligomers of these glycidyl monomeric ethers, and the dlycidyl ethers of soluble, fusible phenol-aldehyde resins often referred to as Novolac resins.

Glycidyl ethers based on Ar(OH)₂ have the formula

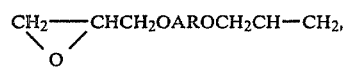

in which some specific examples of Ar are:

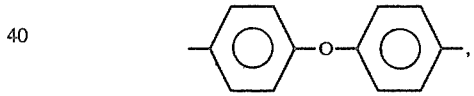

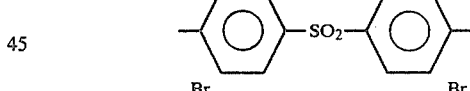

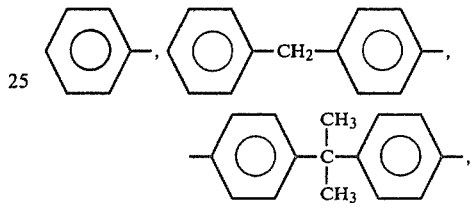

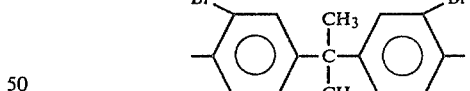

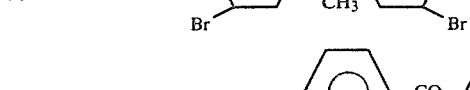

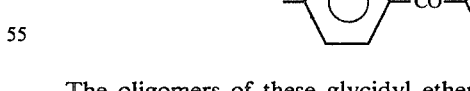

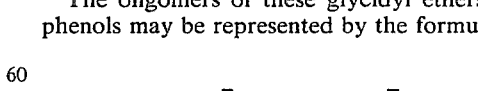

, etc.

The oligomers of these glycidyl ethers of dihydric phenols may be represented by the formula:

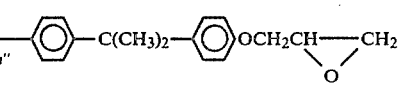

wherein n" is an integer having a value of 1 to 50 or more, preferably 1 to 10; Ar has the same meaning as given above and as illustrated by the various diamines listed above.

Preferred oxiranes based on the Novolac resins have the structure given above in Formula B, particularly those in which R° is H or CH$_3$.

While the reaction of the amine and oxirane groups proceeds merely upon heating at the melting point of the mixture of reactants, generally within the range of 80° C. to 380° C., it is most advantageous generally to use various catalysts such as tertiary amines and other Lewis acids, such as triethylamine, tributylamine, pyridine dimethylbenzyl aniline, tribenzylamine, 2,4,6-tris (dimethylaminomethyl)phenol, triphenyl phosphine, tertiary amine-boron trifluoride complexes, etc. These and other curing catalysts are disclosed in the art, such as in the epoxy handbooks published by Dow Chemical Company and others. At least 0.1 percent, of such catalyst based on total weight of reagents is desirable.

The copolymerization reactions may also be performed in the presence of an added solvent in which the aromatic polyimide is soluble. The specific solvent will depend on the particular aromatic polyimide used. In most cases, the solvent is an aprotic organic compound having a dielectric constant between 35 and 45, preferably one which is water soluble. Representative aprotic compound are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N',N'-tetramethyl-α-ethylmalonamide, N,N,N',N'-tetramethyl glutaramide, N,N,N',N'-tetramethylsuccinamide, thiobis(N,N-dimethylacetamide), bis(N,N-dimethylcarbamylmethyl) ether, N,N,N',N'-tetramethylfuraramide, methylsuccinonitrile, N,N-dimethylcyanocetamide, N,N-dimethyl-β-cyano-propionamide, N-formyl-piperidine and butyrolacetone, etc.

Of the solvents, dimethylacetamide is most preferred. Other preferred solvents are dimethylformamide, N-methyl pyrrolidone, dimethyl sufoxide, butyrolactone and caprolactam.

In many cases, non-aprotic solvents can be used. For example, xylene, phenol, anisole, benzonitrile, acetophenone, methylphenylether, methylene chloride, chloroform, carbon tetrachloride or mixtures of these with each other, with the aprotic solvents or with relatively poor solvents such as benzene, toluene cyclohexane, cyclohexane, dioxane, butyl cellosolve and the like.

The copolymer products can be used as prepared in solution or isolated as a solid product by either evaporating the solvent or by use of a precipitating non-solvent for the polymer. Illustrative precipitating liquids, but not limited thereto, are alcohols such as methanol, ethanol, isopropanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as benzene, toluene, xylene, cyclohexane, cyclohexene; aromatic ethers such as methyl phenyl ether, hydroxy ethyl phenyl ether and water. Water and methanol are preferred.

The copolymer products of this invention may be used in making molded products, laminated products, as impregnants for various materials, wire coatings, etc.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight. In the preparation of the amine-terminated polyimides, the continuous azeotropic technique described hereinabove is used.

EXAMPLE I

Preparation of Amine-Terminated Polyimide #1

Using the m-cresol-benzene azeoptropic procedure described above, there is allowed to react benzophenonetetra-carboxylic acid anhydride (BTCA) (3.222 g., 0.01 mole) and 1,3-di(3-aminophenoxy)-benzene (DAPB) (3.653 g., 0.0125 mole) in 40 ml of m-cresol and 10 ml of benzene. There is obtained more than 95% yield amine-terminated polyimide #1 which is soluble in m-cresol, DMAC, DMF, sulfolane and dioxane. On a preheated melting point bar or plate, this melts at 200° C. The TGA in air shows losses of 0% at 200° C.; 0% at 300° C.; 0% at 400° C.; 2% at 500° C. and 20% at 600° C. The elemental analysis is: C:72.72% and H:3.55%, which are in excellent agreement with the calculated values for the formula:

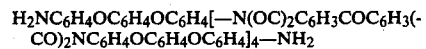

The fact that this product is soluble in the solvents named above indicates that the polyimides are linear and substantially not crosslinked. The polyimide structure is confirmed by an acid number of substantially zero and by the elemental analysis. Moreover the amount of water collected azeotropically conforms very closely to the amount calculated for complete cyclization to polyimide. Moreover, reaction between amine and keto groups requires considerably higher temperature than exists under azeotropic conditions.

EXAMPLE II

Preparation of Amine-Terminated Polyimide #2

Using the m-cresol-benzene azeotropic procedure, there is allowed to react BTCA (0.3222 g., 0.01 mole) and DAPB (3.289 g., 0.01125 mole) in 40 ml of m-cresol and 10 ml of benzene. There is obtained an almost quantitative yield of amine-terminated polyimide #2 which is soluble in m-cresol, DMAC, DMF, sulfolane and dioxane. On a preheated melting point plate this melts at 220° C. The TGA in air shows losses in air of 0% at 200° C., 0% at 300° C., 0% at 400° C., 0% at 500° C. and 23% at 600° C. The elemental analysis shows 72.45% C and 3.31% H which values are in close agreement with the calculated values for the formula:

EXAMPLE III

Preparation of Amine-Terminated Polyimide #3

Using the procedure of Example II, there is reacted BTCA (5.639 g., 0.0175 mole) and 3,3'-sulfonyldianiline (SDA-3,3) (5.938 g., 0.0219 mole) in 40 ml of m-cresol and 10 ml of benzene until 0.65 ml of water is collected. Then the benzene is distilled off and the solution poured into methanol to precipitate the product. This is separated and vacuum dried at 70° C. to afford 9.875 g. (95%) of polyimide #3 which is soluble in m-cresol, DMAC and sulfolane. When a sample is dropped onto a preheated block, it melts at 270° C. The TGA in air gives losses of 0% at 200° C., 0% at 300° C., 0% at 400° C., 1% at 500° C. and 18% at 600° C. Analysis shows 63.7% C., 2.91% H and 5.755 N which values are in excellent agreement with the calculated values for:

H₂NC₆H₄SO₂C₆H₄[—N(OC)₂C₆H₃COC₆H₃-(CO)₂NC₆H₄SO₂H₄]₄—NH₂

EXAMPLE IV

Preparation of Amine-Terminated Polyimide #4

Using the above azeotropic procedure there is allowed to react BTCA (5.639 g., 0.0175 mole) and SDA-3,3' (4.89 g., 0.0197 mole) in 40 ml. of m-cresol and 10 ml. of benzene. There is obtained 18.3 g. (92.5% yield) of polyimide #4 which is a light yellow powder, soluble in m-cresol, DMAC and sulfolane. The lowest temperature at which a sample melts completely when dropped onto a preheated block is 280° C. The TGA in air shows losses of 0% at 200° C.; 0% at 300° C.; 1% at 400° C.; 2% at 500° C.; and 13% at 600° C. The analysis of 63.54% C, 2.81% H and 5.45% N is in close agreement with the theoretical values for

H₂NC₆H₄SO₂C₆H₄[—N(OC)₂C₆H₃COC₆H₃-(CO₂)NC₆H₄SO₂C₆H₄]₈—NH₂

EXAMPLE V

Preparation of Amine-Terminated Polyimide #5

Using the above azeotropic procedure with a ratio of 6 moles of 2,4-diaminotoluene to 5 moles of BTCA, polyimide #5 is obtained which gives elemental analysis conforming closely to the theoretical values for

H₂NC₆H₃(CH₃)[N(OC)₂C₆H₃COC₆H₃NC₃(CH₃)]₅—NH₂

EXAMPLE VI

Preparation of Copolymer #1

Copolymer #1 is prepared by reacting an intimate mixture of amine-terminated polyimide #1 (0.522 g., 0.0002 mole) and 0.068 g. (0.0002 mole) of Epon 828 (the diglycidyl ether of bisphenol A marketed by Shell Chemical Co) in a Wig-L-Jig apparatus for 15 minutes. When a sample of this mixture is placed on a metal block preheated to 225° C., it melts completely to a clear film and crosslinks in 2 minutes. The resulting film is insoluble in hot meta cresol. Another sample of the product is placed between two glass slides and placed on a thermostatically controlled metal block at 225° C. The layer of product between the slides melts to a clear film and cures wthin 2 minutes to give excellent adhesion to the glass. When a sample of polyimide #1 is tested similarly on the preheated melting plate and allowed to remain for 10 minutes there, it does not crosslink, as evidenced by its solubility in m-cresol, and when tested between glass slides, it does not adhere to the glass. The TGA of copolymer #1 shows 0% loss at 200° C.; 2% at 300° C.; 4% at 400° C.; 7% at 500° C. and 20% at 600° C.

EXAMPLE VII

Preparation of Copolymers 2–8

A series of copolymers related to copolymer #1 are prepared by varying the mole ratio of amine-terminated polyimide #1 to diglycidyl ether of bisphenol A above and below the 1:1 mole ratio. The appropriate amounts of the polyimide and the diglycidyl ether are dissolved in ethyl ether, then allowing the ether to evaporate at about 50° C. and vacuum drying before the mixture is further mixed in the Wig-L-Jig apparatus. Samples of the products are tested for melting on both Fisher-Johns apparatus and on a preheated metal block. These values are reported below in Table I which also reports the temperatures at which the TGA in air inflects. Table II reports the losses for TGA in air at different temperatures.

| Co-polymer No. | Mole-Ratio Imide-/Epon | Fisher-Johns Melting Range C° C.) | Drop Melt C° C.) | Temp. of TGA in Air Inflection C° C.) |
|---|---|---|---|---|
| \multicolumn{5}{l}{Copolymers Produced at Various Mole Ratios of Polyimide #1 and Epon 828} |
| 2 | 1/1 | 75–210 | 180 | 565 |
| 3 | 1/1.30 | 75–210 | 180 | 570 |
| 4 | 1/1.95 | 75–120 | 175 | 580 |
| 5 | 1/3.25 | 70–200 | 170 | 595 |
| 6 | 1/0.66 | 80–120 | 185 | 565 |
| 7 | 1/0.33 | 85–215 | 185 | 560 |
| 8 | 1/0.13 | 90–220 | 185 | 560 |

TABLE II

| Copolymer No. | TGA in Air Percent Loss at °C. | | | | |
|---|---|---|---|---|---|
|  | 200 | 300 | 400 | 500 | 600 |
| 2 | 0 | 2 | 4 | 7 | 20 |
| 3 | 0 | 2 | 5 | 8 | 24 |
| 4 | 0 | 2 | 6 | 9 | 29 |
| 5 | 0 | 2 | 8 | 9 | 28 |
| 6 | 0 | 1 | 4 | 5 | 20 |
| 7 | 0 | 1 | 3 | 5 | 20 |
| 8 | 0 | 1 | 4 | 4 | 19 |
| Polyimide #1 | 0 | 0 | 2 | 2 | 20 |

It is obvious from the data of Tables I and II that copolymerization of the amine-terminated polyimide with Epon 828 greatly increases the tractability and processability of the polyimides while maintaining substantially all of the thermal stability of the polyimides even where the mole ratio of epoxy group per mole of NH₂ group is as high as 3.25/1. Furthermore, even when there is less than a 1/1 mole ratio of epoxy group per NH₂ group as in copolymers 6–8, the amount of copolymer formed at these low ratios is sufficient to increase the tractability of the excess unreacted polyimide.

EXAMPLE VIII

The procedures of Examples VI and VII are repeated except that polyimide #2 is used in place of polyimide #1 in the same mole ratios and except that the products are cured at 225° C. instead of 200° C. The resulting data are reported below in Tables III and IV.

TABLE III

| Copolymer No. | Mole-Ratio Imide /Epon | Fisher-Johns Melt. Range (°C.) | Drop Melt (°C.) | TGA Air Inflection, (°C.) |
|---|---|---|---|---|
| 9 | 1/1 | 75–215 | 210 | 580 |
| 10 | 1/1.325 | 45–220 | 200 | 600 |
| 11 | 1/1.95 | 55–225 | 205 | 590 |
| 12 | 1/1.3 | 60–230 | 205 | 600 |
| 13 | 1/0.66 | 80–275 | 210 | 600 |
| 14 | 1/0.33 | 85–280 | 210 | 575 |
| 15 | 1/0.13 | 90–300 | 210 | 600 |

TABLE IV

| Copolymer | TGA Losses in Air Percent Loss at ° C. | | | | |
|---|---|---|---|---|---|
| No. | 200 | 300 | 400 | 500 | 600 |
| 9 | 0 | 0 | 1 | 0 | 22 |
| 10 | 0 | 0 | 4 | 8 | 25 |
| 11 | 0 | 0 | 0 | 3 | 18 |
| 12 | 0 | 0 | 1 | 2 | 13 |
| 13 | 0 | 0 | 1 | 2 | 20 |
| 14 | 0 | 1 | 2 | 4 | 25 |
| 15 | 0 | 0 | 1 | 2 | 12 |
| Polyimide #2 (control) | 0 | 0 | 0 | 1 | 23 |

EXAMPLE IX

Preparation of Copolymer #6

The procedure of Example VI is repeated using in place of Epon 828 the phenolic resin polyglycidyl ether of the structure:

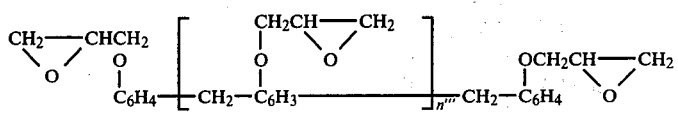

in which n''' has an average value of 2.8 and thus has 4.8 epoxy groups per average molecular weight of 473. This gives approximately one mole of epoxy group per 100 grams of polyglycidyl ether, compared to Epon 828 in which there is approximately one epoxy group per 170 grams of polyglycidyl ether. Accordingly 1.044 g. of polyimide #1 is reacted with 0.104 g. of the phenolic epoxy compound to give approximately a mole-per-mole ratio of $NH_2$ to epoxy groups. There is obtained a cured copolymer having thermal stability comparable to that of copolymer #1.

EXAMPLE X

Preparation of Copolymer 17

This is prepared by the procedure of Example VI using amine-terminated polyimide #3 and Epon 828 in weight proportions to give a mole ratio of 1/1 of $NH_2$ groups to epoxy groups. The resultant copolymer has thermal properties similar to those of copolymer #1.

EXAMPLE XI

Preparation of Copolymer #18

This is prepared by the procedure of Example VI using amine-terminated polyimide #4 and Epon 828 in proportions which give a mole ratio of 1/1 of $NH_2$ per epoxy group. The copolymer has thermal properties similar to those of copolymer #1.

EXAMPLE XII

Preparation of Copolymer #19

Amine-terminated polyimide #5 (21.38 g.) and Epon 828 (3.4 g.) are dissolved in 75 ml. of DMF and warmed at 80° C. until a noticeable increase in viscosity is observed due to copolymer formation. This copolymer solution is cured progressively at 110°, 150° and 200° C. in an air-circulating oven to yield a well bonded, coated wire. This solution is also used for the impregnation of glass mats and glass fabric from which the solvent is evaporated and then the impregnated material laminated under heat at 70°–250° C. and pressure to produce well-laminated boards of high strength and heat resistance. For short curing, molding and laminating temperatures as high as 380° C. may be conveniently used.

EXAMPLE XIII

The procedure of Example VI using in addition to the polyimide #1 and the Epon 828, 0.6 g. of asbestos fiber and 0.01 g. of zinc stearate as a lubricant. After blending the mixture is preformed into a pill and then molded at 200 psi and 200° C. for 5 minutes. The product is a well-molded, blister-free disc of excellent stability.

EXAMPLE XIV

The procedure of Example VI is repeated using in place of the Epon 828 an equivalent amount of polyglycidyl methacrylate as described above, in which n has a value of 10, so that there is a mole per mole ratio of epoxy groups to amine groups. The copolymer product has the tractability and thermal properties similar to those of copolymer #1. Similar results are obtained when polyglycidyl acrylate is substituted for the methacrylate.

EXAMPLE XV

The procedure of Example XII is repeated using in place of the polyglycidyl methacrylate a 50-50 copolymer of methyl methacrylate and glycidyl methacrylate prepared either by copolymerizing equimolar amounts of the two monomers or by hydrolyzing polymethyl methacrylate to remove 50% of the methyl groups and reacting sodium carboxylate groups therein with epichlorohydrin, thereby replacing methyl groups with glycidyl groups. A larger, appropriate amount of the resultant copolymer is used to provide the 1/1 ratio of epoxy groups to amine groups. The polyimide-polyoxirane copolymer product has tractability and thermal properties somewhat similar to those of copolymer #1.

The following example shows that the preparation of a polyamic acid in accordance with Example I of the Chalmers et al, U.S. Pat. No. 3,416,994 and its conversion to a polyimide in accordance with Example 9 of that patent, produces an insoluble polyimide incapable of reacting with epoxy groups.

EXAMPLE XVI

Into a 500 ml, 3-neck round bottom flask equipped with a stirrer, reflux condenser and thermometer, there is charged 25 g of 4,4'-oxydianiline, 173 g N-methyl pyrrolidone and 86 g of N,N-dimethyl acetamide (DMA). The temperature is maintained at 20°–25° C. by means of a cold water bath while 40.7 g of benzophenone tetracarboxylic dianhydride (BTDA) is added. Stirring is continued for 30 minutes after addition is completed. To 100 g of the resultant solution there is added an additional 9.5 g of oxydianiline in 40 g of toluene and stirring continued for 2 hours. One-half of this resin product is placed in two petri dishes in a large forced air oven at 300° C. for 1 hour. Smoking occurs for the first 10–15 minutes until all of the toluene is removed. The temperature is reduced to 260° C. and postcured at this temperature for 64 hours. The product is removed from the oven and ground in a small laboratory grinder. One gram of the powdered material is mixed with 10 g of Ciba Epoxy 6010 and the mixture placed in an oven at 135° C. for 10 minutes. This is then removed and cooled. There is no sign of any discoloration to indicate reaction and the polyimide has settled to the bottom. The mixture is washed several times with ether to remove the epoxy. The powder is dried at 100° C. for 1 hour and an Infrared spectra is run. A similar spectra is made on the polyimide powder to which the epoxy was added. Then 2.138 g of the polyimide powder is added to a solution of 0.34 g of Ciba 6010 Epoxy in 25 ml of ether and evaporated to dryness at 50° C. and then at 100° C. An IR spectra is run on the dried product. None of the IR spectra show any reaction between the epoxy and the polyimide.

Whereas the polyoxirane compounds have been illustrated as glycidyl groups in the above examples, it is intended that other oxirane groups such as

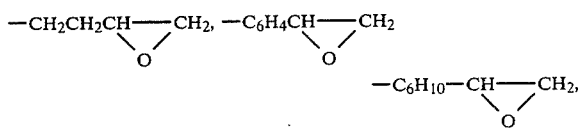

etc. may be used and these are within the scope of this invention.

While certain features of this invention have been described in detail with respect to various embodiments thereof, it will of course be apparent that other modifications can be made within the spirit and scope of this invention and it is not intended to limit the invention to the exact details shown above except insofar as they are defined in the following claims:

The invention claimed is:

1. The process of copolymerizing a polyoxirane compound having at least two

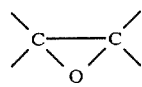

moieties, wherein the unoccupied valencies are attached to carbon or hydrogen atoms and a m-cresol soluble amino-terminated polyimide having the formula:

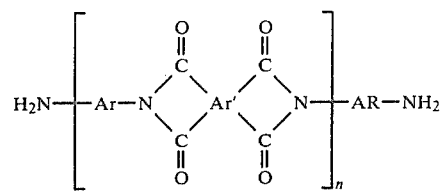

wherein Ar' is a tetravalent aromatic organic radical in which the four carbonyl groups attached thereto are attached directly to separate carbon atoms and each pair of carbonyl groups are attached to adjacent carbon atoms in the Ar' radical except that when Ar' represents the naphthalene radical, one or both pairs of carbonyl groups may be attached to the peri carbon atoms; Ar is a divalent aromatic radical; and n is an integer of at least one; the proportions of said polyoxirane compound and said polyimide being such as to provide at least one oxirane group for each amine group; and said copolymerization being effected at a temperature in the range of 80°–380° C.

2. The process of claim 1 in which said polyoxirane compound has the formula

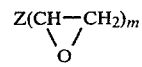

wherein m is an integer having a value of at least 2, and Z is an organic radical having a valency corresponding to the value of m.

3. The process of claim 1 in which said polyoxirane compound is a glycidyl ether selected from the class consisting of:

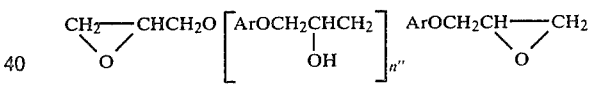

and

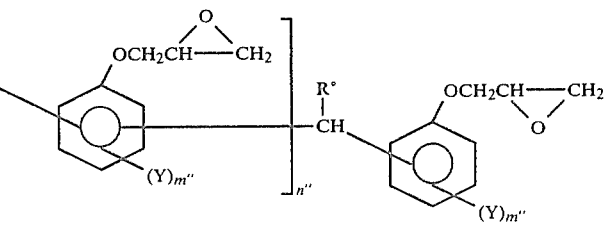

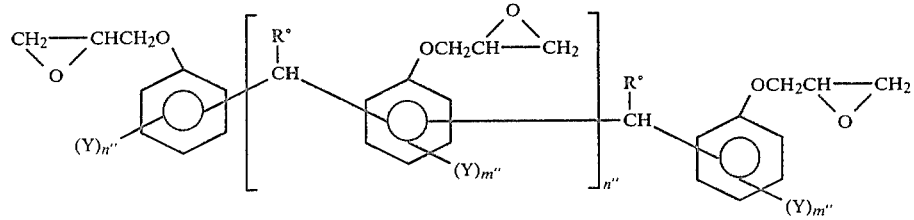

wherein Y represents Cl, Br, I, F or a hydrocarbon radical of 1–18 carbon atoms; n" is an integer having a value of 0 to 50; m" is an integer having a value of 0 to 3; R° is hydrogen or a hydrocarbon radical of 1–10 carbon atoms; and Ar is a divalent aromatic radical.

4. The process of claim 3 in which Ar is:

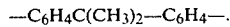

5. The process of claim 3 in which n" has a value of 1 to 10.

6. The process of claim 3 in which R° and Y are hydrogen.

7. The process of claim 3 in which R° is methyl and Y is H.

8. The process of claim 1 in which said polyimide is derived from 3,3',4,4'-benzophenone tetracarboxylic acid dianhydride.

9. The process of claim 1 in which said polyimide is derived from 2,4-diamino toluene.

10. The process of claim 1 in which said polyimide is derived from 4,4'-methylene-dianiline.

11. The process of claim 1 in which said polyimide is derived from 4,4'-oxydianiline.

12. The process of claim 1 in which said polyimide is derived from 1,3-di(aminophenoxy) benzene.

13. The process of claim 1 in which said polyimide is derived from pyromellitic dianhydride.

14. The process of claim 1 in which 1 to 3

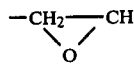

groups are provided for reaction with each amine group.

15. The copolymer reaction product of the process of claim 1.

16. The copolymer product of claim 15 in which said polyoxirane compound has the formula

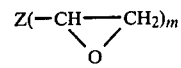

wherein Z is an organic radical having a valency corresponding to the value of m, and m is an integer having a value of at least 2.

17. The copolymer product of claim 3.
18. The copolymer product of claim 4.
19. The copolymer product of claim 17 in which R° and Y are hydrogen.
20. The copolymer product of claim 17 in which Y is hydrogen and R° is $CH_3$.
21. The copolymer product of claim 17 in which $n''$ has a value of 1 to 10.
22. The copolymer product of claim 8.
23. The copolymer product of claim 9.
24. The copolymer product of claim 10.
25. The copolymer product of claim 11.
26. The copolymer product of claim 12.
27. The copolymer product of claim 13.
28. The copolymer product of claim 14.
29. The product of claim 1 in which between 1 and 3.25

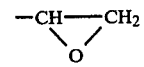

groups are supplied for each $NH_2$ group in said polyimide.

* * * * *

UNITED STATES PATENT AND TRADEMARK OFFICE
CERTIFICATE OF CORRECTION

PATENT NO. : 4,277,583

DATED : July 7, 1981

INVENTOR(S) : Phillip A. Waitkus and Bohumir Lepeska

It is certified that error appears in the above—identified patent and that said Letters Patent is hereby corrected as shown below:

On the first page, the following sentence should be inserted --- This application is a continuation-in-part of application Ser. No. 56,078 filed July 9, 1979, which in turn is a continuation-in-part of application Ser. No. 893,055, filed April 3, 1978, both now abandoned.---

Col. 4, line 21, delete "Z";

Col. 4, line 23, correct the formula to read 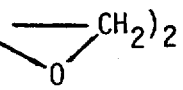

Col. 4, lines 45-50, in the formula, correct "2" to read ---Z---;

Col. 8, line 58, delete "Z";

Col. 8, lines 62-64, correct the formula to read 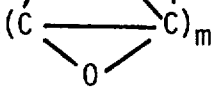

Col. 11, line 18, correct "m""to read ---n"---;

Col. 11, line 61, correct "proortions" to read ---proportions---;

Col. 12, line 16-19, correct the formula to read

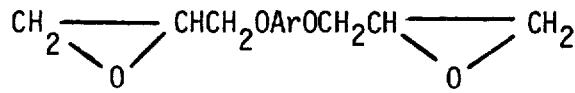

UNITED STATES PATENT AND TRADEMARK OFFICE
CERTIFICATE OF CORRECTION

PATENT NO. : 4,277,583

DATED : July 7, 1981

INVENTOR(S) : Phillip A. Waitkus and Bohumir Lepeska

It is certified that error appears in the above—identified patent and that said Letters Patent is hereby corrected as shown below:

Col. 12, lines 22-25, correct the formulas to read

Col. 13, line 46, after "toluene" insert comma (,);
Col. 18, line 5, after "VI" insert --- is repeated---;
Col. 21, lines 23-24, correct the formula to read $CH_2 \underset{O}{\diagdown\diagup} CH-$ .

Signed and Sealed this

Twentieth Day of October 1981

[SEAL]

Attest:

GERALD J. MOSSINGHOFF

Attesting Officer

Commissioner of Patents and Trademarks